(12) United States Patent
Kaaden et al.

(10) Patent No.: US 6,411,500 B1
(45) Date of Patent: Jun. 25, 2002

(54) COMMUNICATION SWITCHGEAR UNIT WITH BUSBAR ASSEMBLY

(75) Inventors: Peter Kaaden, Schwandorf; Joachim Bury, Kümmersbruck, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/530,767

(22) PCT Filed: Oct. 21, 1998

(86) PCT No.: PCT/DE98/03093

§ 371 (c)(1),
(2), (4) Date: Jul. 12, 2000

(87) PCT Pub. No.: WO99/23736

PCT Pub. Date: May 14, 1999

(30) Foreign Application Priority Data

Nov. 3, 1997 (DE) .......................................... 197 48 429

(51) Int. Cl.⁷ .............................. H02B 1/20; H05K 7/00
(52) U.S. Cl. ......................... 361/614; 361/624; 361/637
(58) Field of Search .................................. 361/610, 611, 361/614, 637, 640, 728, 729, 730, 735, 807, 823, 824, 615–636; 439/709

(56) References Cited

U.S. PATENT DOCUMENTS 5,629,831 A * 5/1997 Eggert et al. ................ 361/624
5,722,862 A * 3/1998 Glathe et al. ................ 439/709
5,978,193 A * 11/1999 Kaaden ........................ 361/64

FOREIGN PATENT DOCUMENTS

| DE | 43 03 717 | 8/1994 |
|---|---|---|
| DE | 44 02 001 | 7/1995 |
| DE | 44 02 002 | 7/1995 |
| DE | 44 38 804 | 3/1996 |
| DE | 44 38 806 | 3/1996 |
| DE | 44 46 601 | 6/1996 |
| DE | 195 15 923 | 11/1996 |
| DE | 195 21 001 | 12/1996 |
| DE | 197 34 709 | 11/1998 |
| EP | 0 229 590 | 7/1987 |
| EP | 0 236 711 | 9/1987 |
| EP | 0 709 933 | 5/1996 |
| EP | 0 753 916 | 1/1997 |
| WO | WO 96/42188 | 12/1996 |

OTHER PUBLICATIONS

"Bussysteme in der Automatisierungstechnik," Schwerpunkt Steuerungs and Regelungstechnick, Jul. 23, 1996.
"Eigensichere Prozessmesstechnik mit Bus–Anschluss: Sanfter Öbergang," iee 40, Nr. 10, Jan. 11, 1995.
Lawrence, George, "Connectors Boost System," Electronics Week, Jan. 21, 1985.

* cited by examiner

Primary Examiner—J. R. Scott
(74) Attorney, Agent, or Firm—Harness Dickey & Pierce PLC

(57) ABSTRACT

A switchgear and control unit with a communications capability is provided that includes a bus system with a power bus, and can easily be expanded allowing connection to the power bus with protection against direct contact. The switchgear and control unit is provided with a modular support having an integrated, modular bus system. Connections to a power bus section are arranged in a guide shaft.

12 Claims, 7 Drawing Sheets

COMMUNICATION SWITCHGEAR UNIT WITH BUSBAR ASSEMBLY

FIELD OF THE INVENTION

The present invention relates to a switchgear unit with a communications capability for connection to a bus system which contains a power bus, a data bus as well as at least one auxiliary power bus. The switchgear unit, which is used for operational switching and protection of a load, includes a support and an assembly that can be mounted on this support. A bus system can be inserted into the support, and the assembly makes contact with the bus system after mounting on the support.

BACKGROUND INFORMATION

A switchgear unit is described in European Patent No. 0 753 916, which relates to a load feeder. The power bus, the data bus and the auxiliary power bus in this case are routed as a busbar in the base part of the load feeder, once the latter has been installed in the cubicle. This means that, for installation, it must be clear from the start which switching devices are to be provided at what point in the cubicle. The conventional busbar adapter system is used for connection of a motor feeder and has on its upper face top-hat section rails onto which a contact and/or a power breaker can be snapped. The busbar adapter system contains a trough that is composed of a base part and a trough upper part. Retaining elements for holding bus bars are provided in the base part. The trough upper part contains openings, which are protected against direct contact at the front, and which, the contacts on an adapter upper part can be passed in order to make contact with the bus bars. This is done by hooking the adapter in, and pivoting it into place.

A switch gear unit with a communications capability is described in PCT Published Patent Application No. WO 96/42188, which provides simple adaptation and contact with switching devices, in conjunction with the electronics required for data communication, for a cubicle with a data bus. The switchgear unit includes an equipment base to which a plurality of switching devices can be adapted via a standard profiled rail, as well as a communications unit, which is held on the equipment base and has plug contacts via which the switching devices are actuated electrically. The switchgear unit may include, for example, a contact and/or a power breaker. If a further switching device is required, the equipment base is expanded by adding an equipment base expansion part.

Main power connections for connection to a three-phase busbar system are located on the rear wall of the equipment base of the switchgear unit. The switchgear unit is simultaneously held and made contact with by being hooked in on the bus bars. The data is transmitted to the electronics in the communications module via a bus connector or insulation-displacement contact with a bus line, directly at the communications module.

In the case of automation devices, and as described in European Patent No. 0 236 711, it is conventional for mounting racks to be used for adaptation of input/output assemblies. The mounting racks can be snapped onto supporting rails and can be connected to one another via additional control lines. In this case, the mounting racks are designed individually as modular mounting racks having a matching circuit. A connecting block for the external wiring is mechanically connected to each mounting rack. The connecting block and mounting rack can be connected to the individual assemblies via a plug connection.

In this case, the matching circuit is in the form of a circuit board in the mounting rack. Female connecting strips for connection to male connections on the input/output assemblies are arranged on the circuit board.

The modular mounting racks are connected to one another via a male connector strip which, connected to the circuit board, is connected via a ribbon cable to which, for its part, a female connector strip is connected. The electrical connection to the male connector strip on the adjacent mounting rack can be made via this female connector strip. The mounting racks can be connected to one another, side-by-side, by hooking tabs, which project at the sides, into recesses of matching design in the enclosures of the mounting racks. The electrical connection is made independently of this. German Patent Application No. 197 34 709 describes a switchgear system having a power bus of modular construction. In this case, a plurality of switching devices are operated via the same power feeder. To do this, each switching device has an associated power bus module, which in each case has a power bus section via which the associated switching device can be electrically connected to the power feeder. In this case, the power bus sections are connected to one another to form a continuous distribution rail. The power feeder can be connected at least to one of the power bus sections.

SUMMARY OF THE INVENTION

An object of the present invention is to provide a switchgear and control unit that has a communications capability, can be expanded with little effort including the required bus system, and at the same time allows simple installation and disassembly while maintaining the protection against direct contact during connection to the power bus.

In this case, the configuration of the support as a modular base lower part with an integrated modular bus system makes it possible to expand the support system as required, while at the same time lengthening the bus system, in a single operation. This modular design allows a switchgear system to be constructed that is matched to the desired scope at that time, with only those components which are absolutely essential being used. This achieves a considerable cost saving.

The arrangement of the connections on the power bus section in a guide shaft, which at the same time centers the assembly on the base lower part for mounting and while making contact carries out the functions of mechanical and electrical connection in one operation. In this case, the required protection against direct contact is achieved by the position of the connections on the power bus section in the guide shaft. This results in safe connection and release of the connections to the power bus section, which generally has voltages of more than 100 V applied to it.

An advantageous embodiment of the present invention is obtained if the assembly is coupled to the base lower part in such a manner that partial loosening of the assembly with simultaneous disconnection of the contact with the control bus section is possible, while maintaining the connections to the power bus section.

Specifically, the early disconnection of the connections for the data bus section means that the contacts of the switchgear unit are opened, thus ensuring operational disconnection of connected loads from the power bus in all cases. This also ensures that, when the assembly is finally detached with the plug contacts to the power bus being withdrawn, this process is carried out only in a non-live state.

The coupling of the assembly is advantageously provided by a joint and/or rotating mechanism.

It is also advantageous for the base lower part to be composed of a support with the guide shaft and a module which can be coupled to it. This modular construction makes it possible to couple application-specific modules to it, that is to say to match the configuration to the actual requirements, while minimizing the cost involved. For the configuration to provide a load feeder, the module is designed as a power bus module.

A further advantage is obtained if the support is designed with an attachment element which, when operated, allows the support to be latched simultaneously on a standard profiled rail and a further support arranged in a row, in one operation.

This design contributes to a low level of installation and disassembly effort, which is a major advantage with respect to commissioning and expansion, as well as testing of the switchgear and control unit.

A particularly cost-effective design is obtained if the attachment element is designed as a spring-loaded slide with a latching tab for latching to the standard profiled rail and latching element for locking to a further support arranged in a row.

This represents a solution with a low level of parts complexity, which is advantageous in terms of the cost for production and storage. In order to withdraw the assembly from the support, it is advantageous if this assembly can be withdrawn from the base lower part via a pulling element on its front face. This allows simple, single-handed disassembly to be achieved with a compact configuration of a plurality of switchgear and control units alongside one another.

Further options for matching the switchgear unit to the respective system requirements are obtained if, on its connection side, which is intended for adaptation of the assembly, the support has recesses for accommodating contact inserts for bus expansion via which the modular bus system can be expanded, and plug inserts can be inserted into the assembly. The connection side of the plug inserts is suitable for connection to the contact inserts.

The present invention allows, optimization of the cubicle construction while at the same time including low-voltage switchgear in the automation process. The following specific tasks relating to this may be realized:

minimizing space in the cubicle,
  reducing the installation cost,
  simplifying the installation work,
  reducing the wiring complexity for the control wiring,
  reducing the wiring complexity for the main power,
  reducing the test effort,
  simplifying servicing.

The functions of "mechanical attachment/control wiring of the switch gear/main power feeder, distribution and outgoers/switching and protection of loads/commissioning and servicing" for groups of load feeders are considered and optimized for this purpose.

The solution includes a modular system which allows cubicles to be constructed simply by joining components together. The modular construction allows a switchgear system to be constructed with the actually required scope, thus resulting in a considerable cost saving.

DETAILED DESCRIPTION

Figure 1:
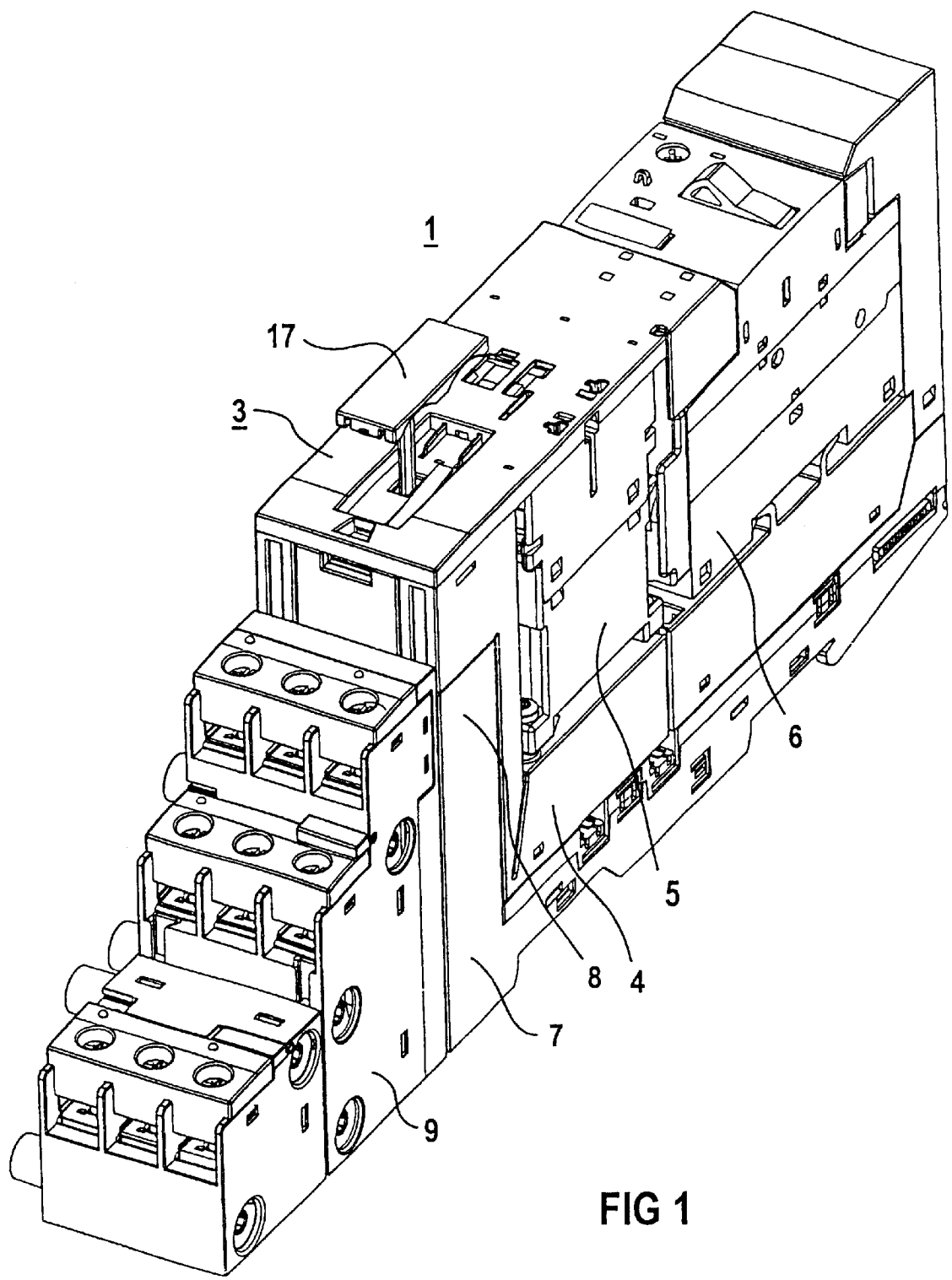
FIG. 1 shows a modular load feeder with a support and power bus module in an installed state.
Figure 2:
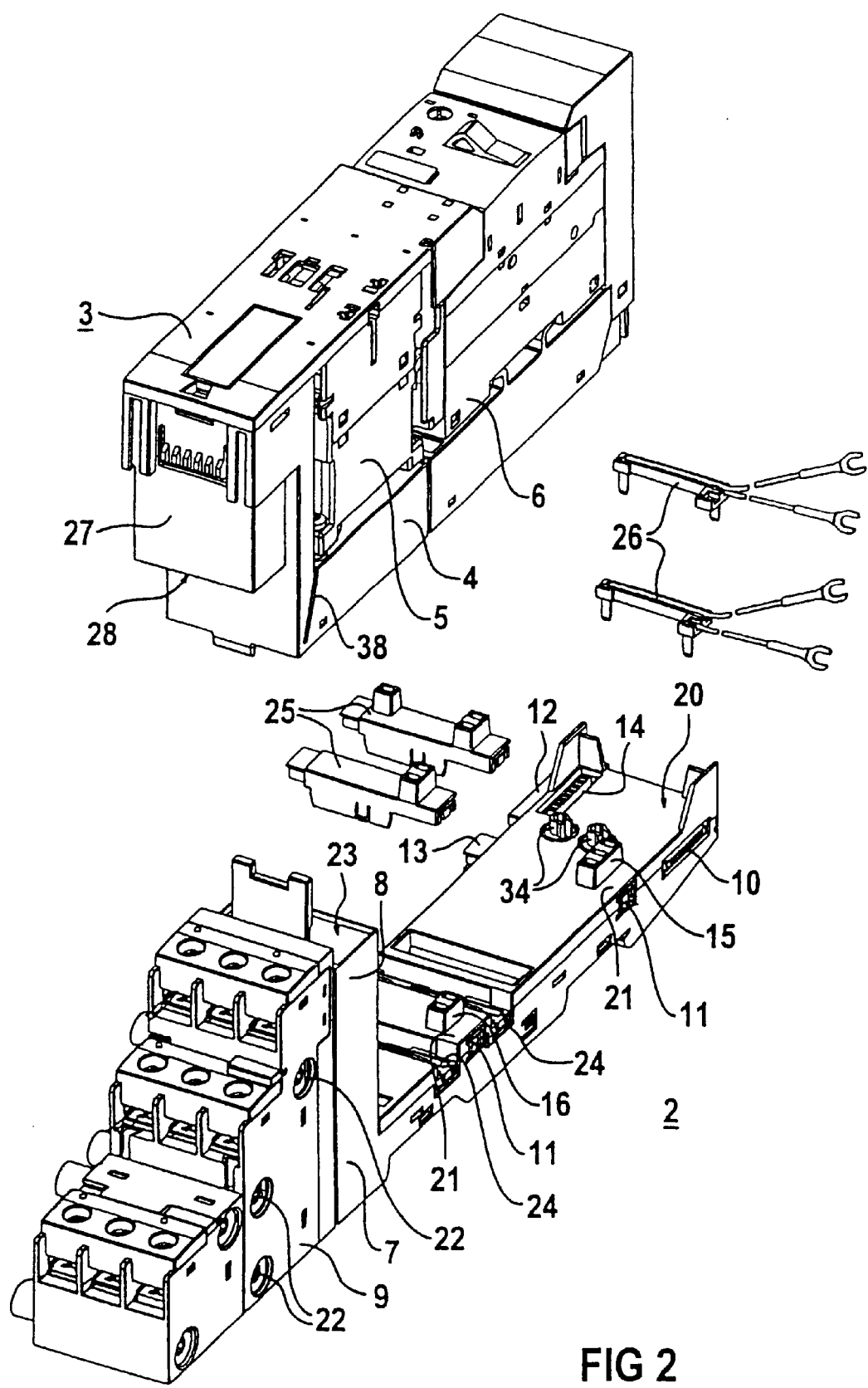
FIG. 2 shows a view of the modular load feeder from FIG. 1 in an uninstalled stated.

The modular, expandable load feeder 1 shown in FIG. 1 includes, according to FIG. 2, a base lower part 2 and a feeder assembly 3, which can be mechanically and electrically adapted to it. The feeder assembly 3 contains an intermediate support 4 as well as a contact or 5, mounted on it, and a power breaker 6.

The base lower part 2 essentially comprises an L-shaped support 7 with a guide shaft 8, to which a power bus module 9 is coupled. A control bus section is integrated in the support 7 and, for example, optionally includes a data bus section 20 as well as an auxiliary power bus section 21, both of which have associated connecting means 10,11 and mating connecting means 12, 13 which are accessible on both sides of the support 7 and are in this case configured as blades on the one side and as sockets on the other side. A female connector strip 14 is provided on the top of the support for connection of the feeder assembly 3 to the data bus section 20, and female connector strips 15 and 16 are provided for connection to the auxiliary power bus sections 21.

The power bus module 9 includes the power bus sections 22 via which the main power is passed to a load, which can be connected to the load feeder 1. The connection to the power bus sections 22 is made via plug contacts 23, which are located in the guide shaft 8, but cannot be seen here. The front face of the support 7 has recesses 24 in which contact inserts 25 can be inserted, as required. These can make contact with plug inserts 26, which can likewise be inserted retrospectively on the feeder assembly 3, for example for actuating auxiliary switches on the feeder assembly 3.

The feeder assembly 3 has a channel 27, which forms a positive lock with the guide shaft 8 and in this case has a rectangular cross section, and in which mating plug contacts 28 are located in order to make contact with the plug contacts 23 in the guide shaft 8. The guide shaft 8 is thus simultaneously used for centering for mechanical adaptation of the feeder assembly 3 on the base lower part 2, and for electrical connection to the power bus section 22.

The position of the plug contacts 23 and of the mating plug contacts 28 in the guide shaft 8 and channel 27, respectively, ensures the required protection against direct contact with the high operating voltages of more than 100 V in the main power circuit.

Figure 3:
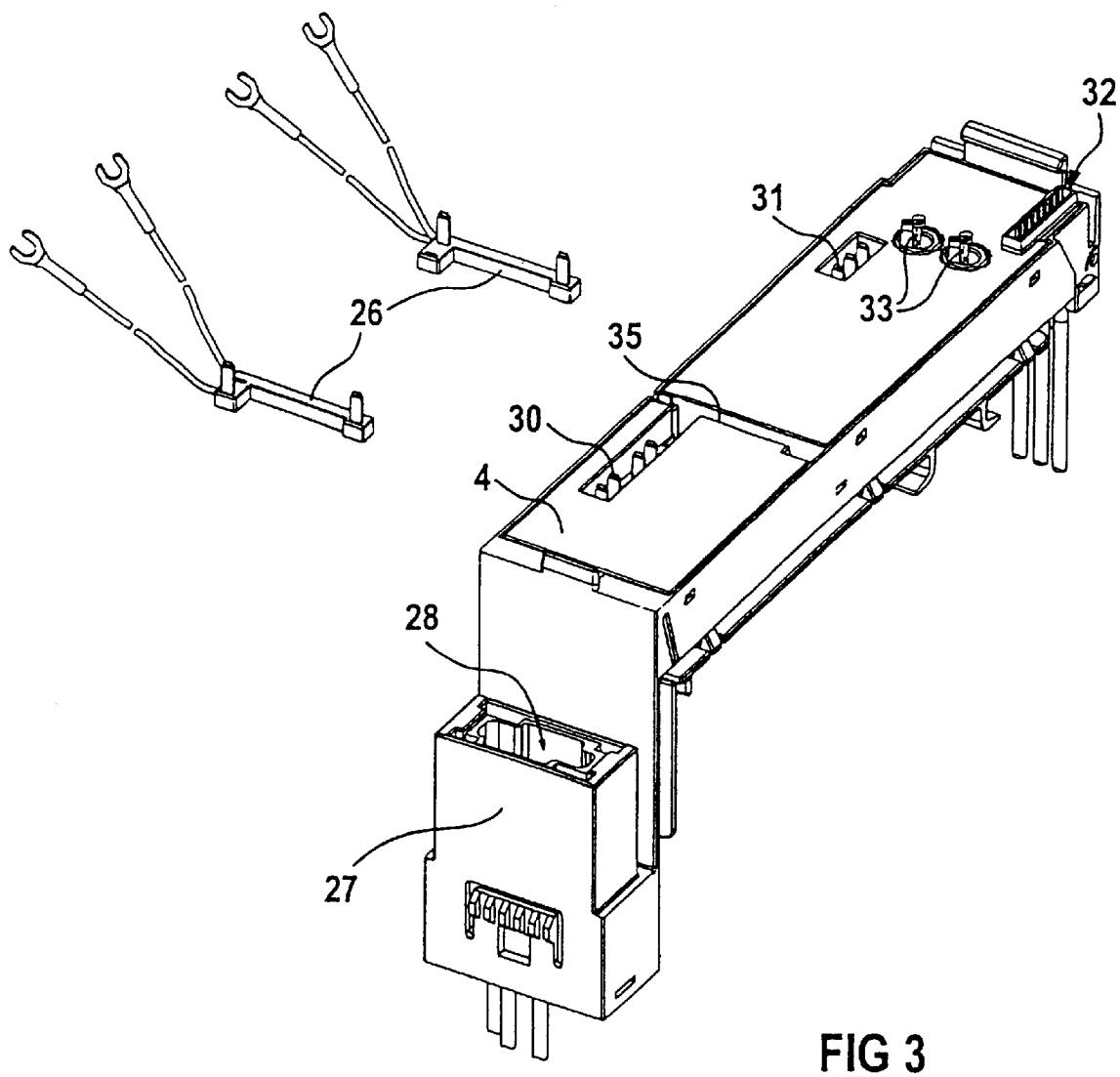
FIG. 3 shows a view of an underneath of a feeder assembly.

FIG. 3 shows a view from underneath of the intermediate support 4, which is designed in an L-shape matched to the support 7 of the base lower part 2, and includes the channel 27 with the mating plug contacts 28. The blade contacts 30 and 31, which are used to make contact with the auxiliary power bus sections 21, as well as the contact strip 32 for connection to the data bus section 20 are located on the lower face. Coding elements 33 on the intermediate support 4 and corresponding coding elements 34 on the base lower part (see FIG. 2) allow specific equipment configurations to be connected and prevent others from being connected. The control inserts 26 can be incorporated in a slot 35 on the lower face of the intermediate support 4.

Figure 4:
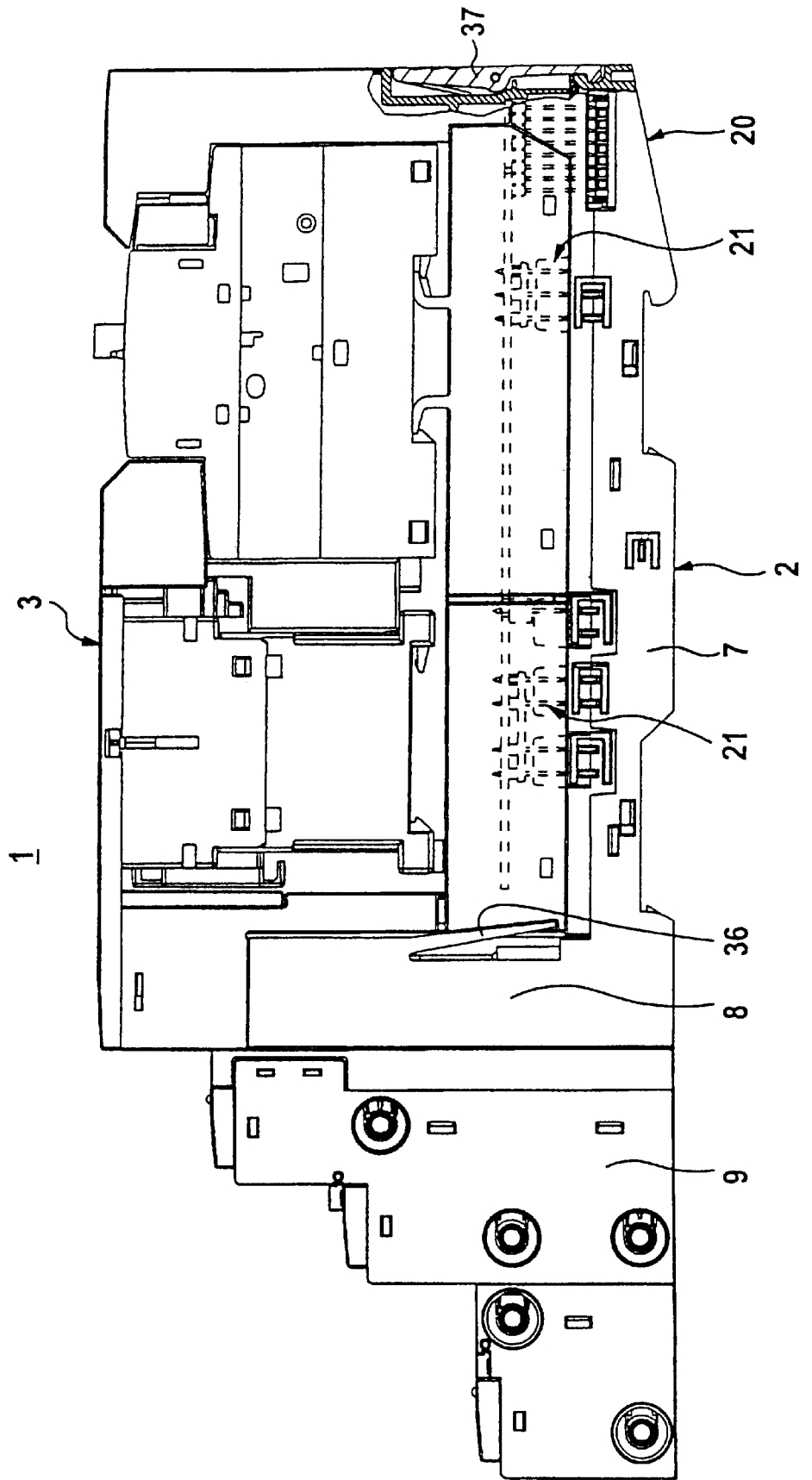
FIG. 4 shows a side view of a load feeder in an installed state.
Figure 5:
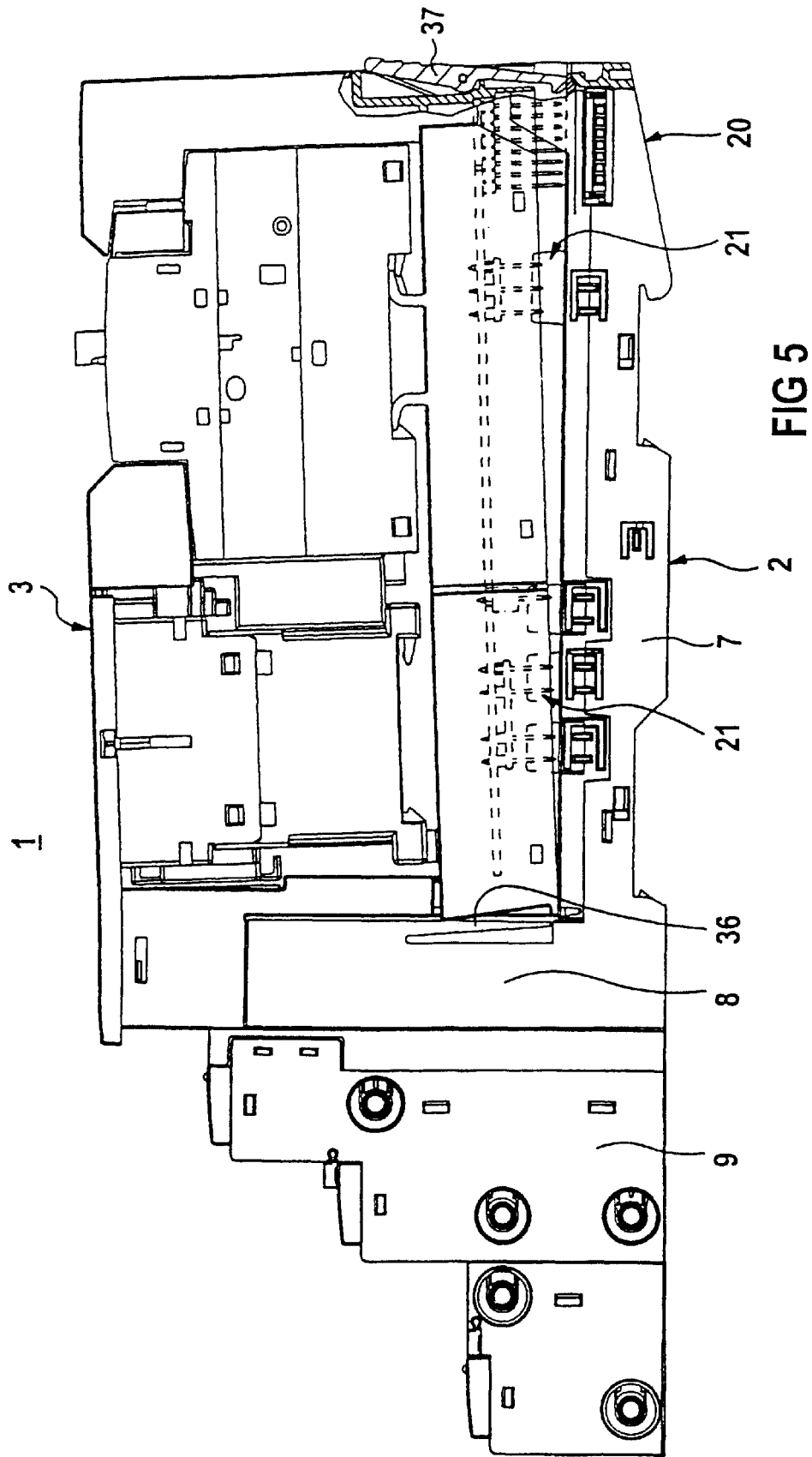
FIG. 5 shows a side view of a load feeder with a feeder assembly, disconnected from the data bus and in a pre-latched position.

FIG. 4 shows a side view of the load feeder 1 in the adapted state with contact made, in which a latching spring 36 on the guide shaft 8 locks the feeder assembly 3 to the base lower part 2 with respect to pulling. These can be detached upwards via a latching hook 37 on the feeder assembly 3. To do this, once the latching hook 37 has been operated, the feeder assembly 3 is moved to a pre-latched position shown in FIG. 5. In this pre-latched position, the connection for the control and data bus section 20 is disconnected. A rotary movement to the pre-latched position results in the feeder assembly 3 pressing the latching spring 36 back, this canceling the lock against pulling on the base lower part 2. Once this has been done, the feeder assembly 3 can be withdrawn from the base lower part 2 via a pulling element 17 on the front face of the feeder assembly 3, as shown in FIG. 1. The rotary movement is achieved by utilizing the material characteristics and/or a joint and rotating mechanism, which, according to FIG. 2, can be provided by a physical stamping on the enclosure of the feeder assembly 3, for example via a slot 38 in the intermediate support 4. This at the same time provides a spring element stamping and moving (rotary movement) the feeder assembly 3 back into position. Instead of the rotary movement, the contact with the control bus section 20, 21 can also be released by releasing the feeder assembly 3 to the pre-latched position.

Figure 6:
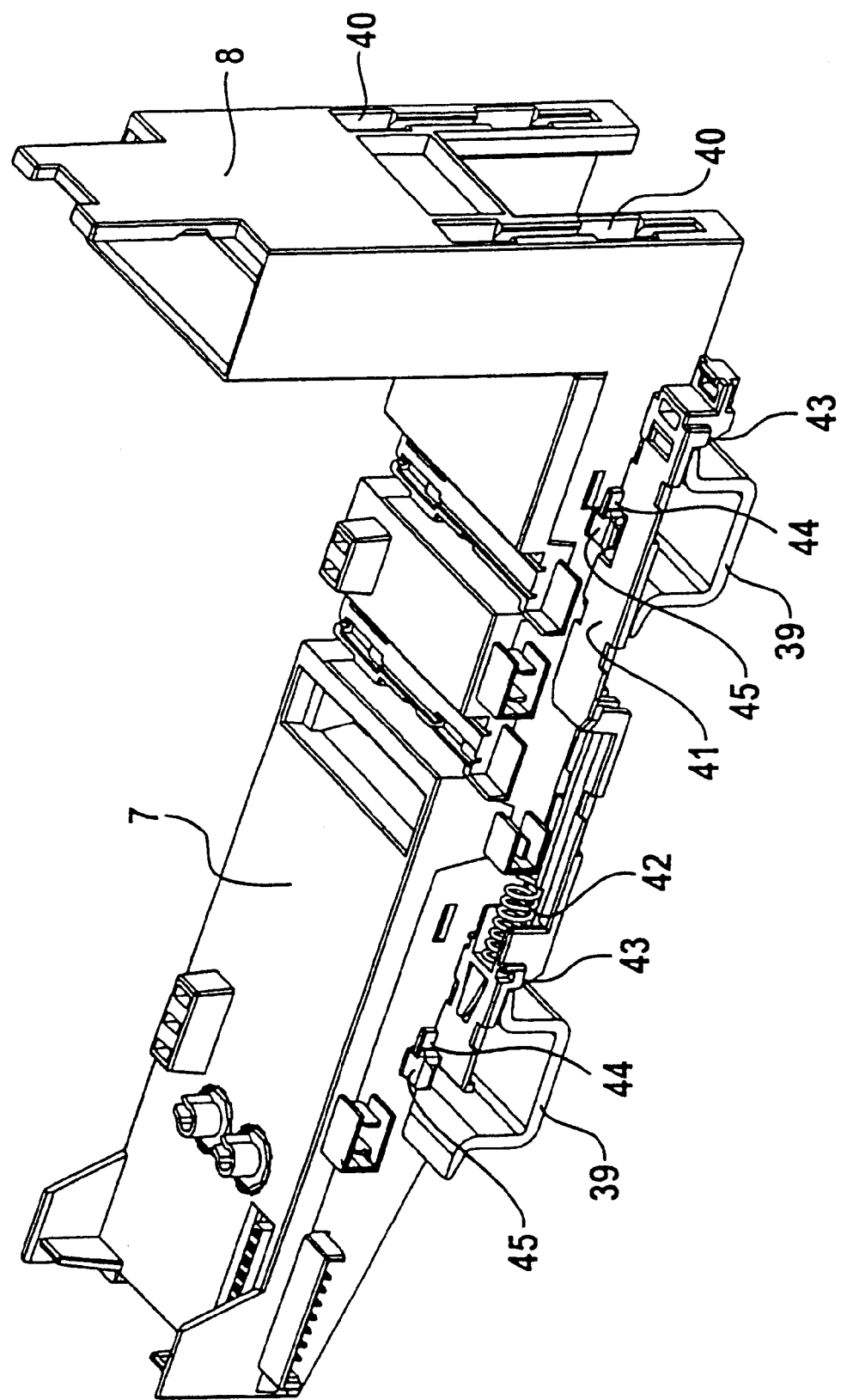
FIG. 6 shows a support, latched on a standard profiled rail, of the load feeder shown in FIGS. 1 and 2.

FIG. 6 shows a support 7, which is latched on two standard profiled rails 39, of a base lower part 2. The guide shaft 8 of the support 7 is provided with a contour 40 for coupling various fitting elements, for example a power bus module 9 as shown in FIG. 2 or other modules with special functions, such as brakes, thermistor protection, etc. A slide 41 is fixed to the support 7, preloading a compression spring 42, via which slide 41 provides that the coupling to the standard profiled rails 39 and the locking to a further base lower part 2 arranged in a row, takes place in one operation. To do this, the slide 41 is provided with latching tabs 43 in order to latch behind the standard profiled rails 39, and on the upper face with two webs 44 which latch behind the latching hooks 45 on the side wall of a base lower part 2 arranged in a row.

Figure 7:
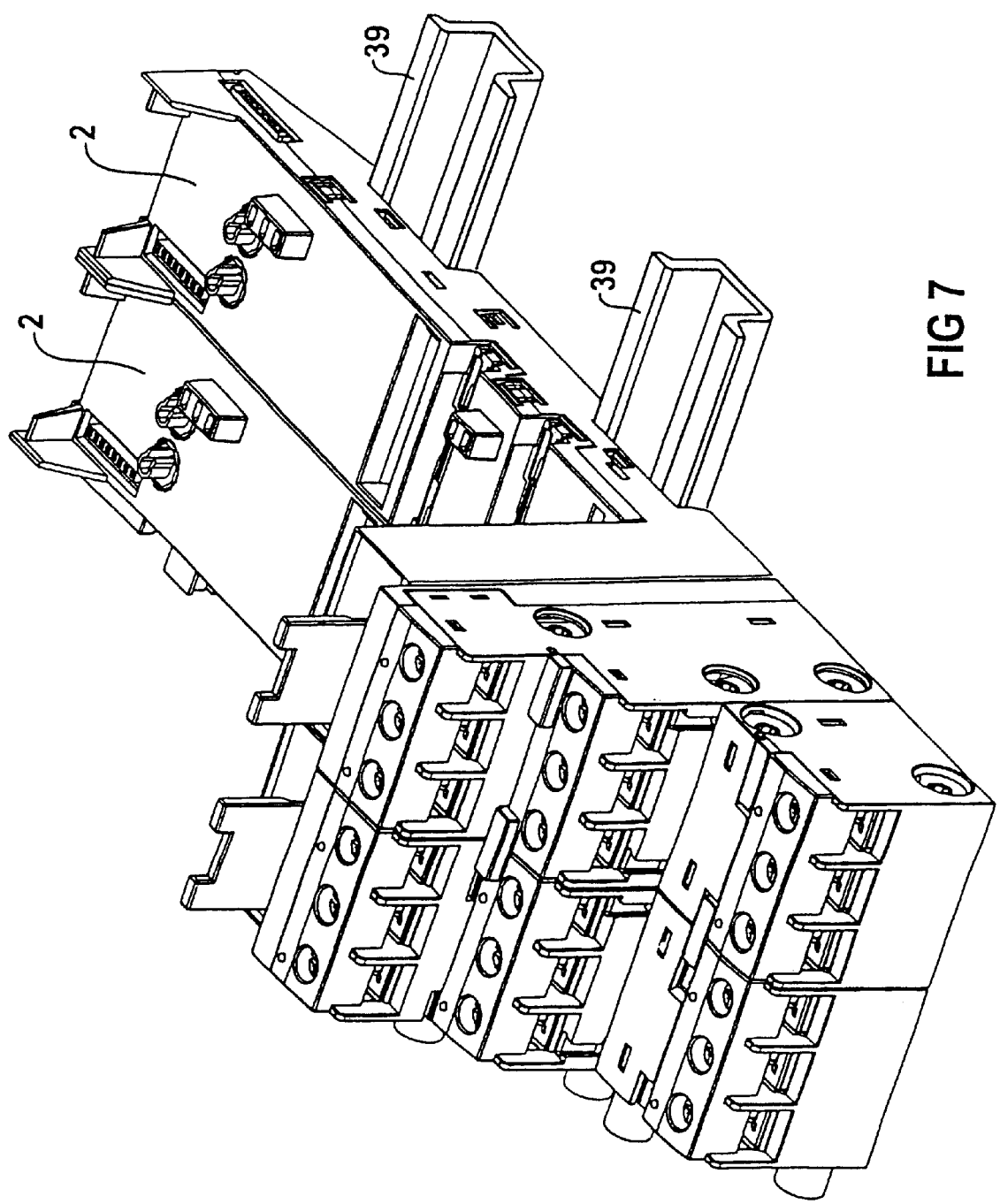
FIG. 7 shows two mechanically and electrically connected base lower parts of the load feeders shown in FIGS. 1 and 2.

FIG. 7 shows two base lower parts 2 which are latched on standard profiled rails 39 and are locked with respect to one another, via which permanent wiring is constructed in a modular fashion. The actual functional assemblies, for example the feeder assemblies 3, make electrical contact with the entire bus system in conjunction with the mechanical adaptation on the base lower parts 2. This results in considerable simplification of configuration, installation, commissioning, and in the required tests.

What is claimed is:

1. A switchgear unit with a communications capability for connection to a bus system, the bus system including a power bus, a control bus, and at least one auxiliary power bus, the switchgear unit being used for operational switching and protection of a load, the switchgear comprising:

a support, the bus system being insertable into the support, the support being a modular base lower part including an integrated modular bus system in the form of a power bus section and a control bus section, connections to the power bus section being arranged in a guide shaft; and an assembly mountable on the support, the assembly making contact with the bus system after mounting on the support, the guide shaft centering the assembly on the modular base lower part.

2. The switchgear unit according to claim 1, wherein the base lower part further includes a data bus section and an auxiliary power bus section.

3. The switchgear unit according to claim 1, wherein the assembly is coupled to the base lower part so that partial loosening of the assembly with simultaneous disconnection of contact with the control bus section is possible while maintaining the connections to the power bus section.

4. The switchgear unit according to claim 3, further comprising:

at least one of a joint and a rotating mechanism coupling the assembly to the base lower part.

5. The switchgear unit according to claim 1, wherein the modular base lower part includes the support, the guide shaft and a module coupled to the guide shaft.

6. The switchgear unit according to claim 5, wherein the module includes a power bus module.

7. The switchgear unit according to claim 1, wherein the support includes an attachment element wherein, in one operation the attachment element allows the support to be latched simultaneously on a standard profiled rail and a further support, the standard profiled rail and the further support being arranged in a row.

8. The switchgear unit according to claim 7, wherein the attachment element is a spring-loaded slide with a latching tab for latching to the standard profiled rail and a latching element, the latching element for locking to the further support.

9. The switchgear unit according to claim 1, wherein the assembly is equipped as a feeder assembly, the assembly including at least one of a contact and a power breaker.

10. The switchgear unit according to claim 1, wherein the assembly includes at least one of a contact and an overload relay.

11. The switchgear unit according to claim 1, wherein the assembly includes a pulling element arranged on a front face of the assembly, the assembly being removable from the modular base lower part using the pulling element.

12. The switchgear unit according to claim 1, wherein the support has a connection side for adaptation of the assembly, the connection side of the support having recesses for accommodating contact inserts, the bus system being expandable via the contact inserts, plug inserts being insertable into the assembly, a connection side of the plug inserts being suitable for connection to the contact inserts.

* * * * *